United States Patent
Piontek et al.

(10) Patent No.: US 8,445,557 B2
(45) Date of Patent: May 21, 2013

(54) SCRATCH- AND WEATHER-RESISTANT VARNISH CURABLE BY MEANS OF ACTINIC RADIATION OR CURABLE BY HEAT AND BY MEANS OF ACTINIC RADIATION

(75) Inventors: Susanne Piontek, Münster (DE); Nicole Stegemann, Senden (DE); Melanie Glomb, Ahlen (DE); Lars Hoffmann, Ladenburg (DE)

(73) Assignee: BASF Coatings GmbH, Munster (DE)

( * ) Notice: Subject to any disclaimer, the term of this patent is extended or adjusted under 35 U.S.C. 154(b) by 78 days.

(21) Appl. No.: 13/124,242

(22) PCT Filed: Oct. 13, 2009

(86) PCT No.: PCT/EP2009/007344
§ 371 (c)(1),
(2), (4) Date: Apr. 14, 2011

(87) PCT Pub. No.: WO2010/043374
PCT Pub. Date: Apr. 22, 2010

(65) Prior Publication Data
US 2011/0201720 A1    Aug. 18, 2011

(30) Foreign Application Priority Data
Oct. 14, 2008 (DE) .......... 10 2008 051 472

(51) Int. Cl.
*C08G 61/12* (2006.01)
*H05B 6/68* (2006.01)

(52) U.S. Cl.
USPC ............................................ 522/167; 522/1

(58) Field of Classification Search
USPC ..................................... 522/167, 1
See application file for complete search history.

(56) References Cited

U.S. PATENT DOCUMENTS

| 5,425,970 | A * | 6/1995 | Lahrmann et al. ........... 427/493 |
| 6,261,645 | B1 * | 7/2001 | Betz et al. ..................... 427/500 |
| 7,129,280 | B2 * | 10/2006 | Baumgart et al. ............. 522/152 |
| 2003/0129323 | A1 * | 7/2003 | Dornieden et al. ........... 427/553 |
| 2005/0100685 | A1 * | 5/2005 | Flosbach et al. ............... 428/31 |
| 2006/0228481 | A1 * | 10/2006 | Gros et al. .................... 427/299 |

FOREIGN PATENT DOCUMENTS

| DE | 19709467 C1 | 10/1998 |
| DE | 19920801 | * 11/2000 |
| DE | 10129969 A1 | 1/2003 |
| EP | 0204161 A2 | 12/1986 |
| EP | 0568967 A2 | 11/1993 |
| JP | 08217840 A | 8/1996 |
| WO | WO2005/120725 A1 | 12/2005 |
| WO | WO2007012619 A1 | 2/2007 |

OTHER PUBLICATIONS

International Preliminary Report on Patentability for International application No. PCT/EP2009/007344 dated Apr. 19, 2011.
International Search report for International application No. PCT/EP2009/007344 dated Feb. 4, 2010.
Written opinion for International application No. PCT/EP2009/007344.

* cited by examiner

*Primary Examiner* — Ling Choi
*Assistant Examiner* — Jessica E Whiteley
(74) *Attorney, Agent, or Firm* — Cantor Colburn LLP

(57) ABSTRACT

A coating composition curable with actinic radiation, or thermally and with actinic radiation, comprising (A) at least one unsaturated urethane (meth)acrylate and (B) at least one unsaturated melamine (meth)acrylate, wherein the ratio of the weight fractions of components (A) and (B) is between (A):(B)=1:1 and (A):(B)=1:5.

16 Claims, No Drawings

SCRATCH- AND WEATHER-RESISTANT VARNISH CURABLE BY MEANS OF ACTINIC RADIATION OR CURABLE BY HEAT AND BY MEANS OF ACTINIC RADIATION

CROSS REFERENCE TO RELATED APPLICATIONS

This application is a National Phase Application of Patent Application No. PCT/EP2009/007344 filed on 13 Oct. 2009, which claims priority to DE 10 2008 051472.1, filed 14 Oct. 2008, both of which are hereby incorporated by reference in their entirety.

FIELD OF THE INVENTION

The present invention relates to coating compositions which are curable with actinic radiation, or thermally and with actinic radiation, which have particular scratch and weathering resistance and which are based on urethane (meth)acrylates. The invention further relates to the use of a coating composition of this kind to produce a coating system, and also to the substrates coated with such a coating composition.

BACKGROUND

Coating compositions curable with actinic radiation and based on urethane (meth)acrylates are already known and are described, for example, in the international patent application WO2005/120725. There they are used, in particular, for automotive refinish. In that application, of course, they are subject to exacting requirements in terms of scratch resistance and weathering resistance. The scratch resistance of the coating systems obtained from these coating compositions can be improved, as is known, by an increase in the density of crosslinking. A disadvantage of this, however, is the loss of coating-system elasticity that typically accompanies such an increase. Although the highly crosslinked coating systems often do display a very high scratch resistance, they nevertheless tend to crack, owing to the inadequate elasticity, and consequently do not have optimum weathering stability.

The problem of the loss of elasticity was also recognized in German patent DE 197 09 467. That patent subsequently claims, in general, coating materials which in the cured state are to have a storage modulus E' in the rubber-elastic range of at least $10^{7.6}$ Pa and a loss factor tan δ at 20° C. of not more than 0.10. The binder is to be selected in accordance with the stated physical criteria of the fully cured coating system. With regard to the chemical nature of the binder, all that is proposed is a broad range of classes of compound, from which individual binders might possibly meet these criteria for the fully cured coating system. Examples specified include (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates and the corresponding methacrylates (page 4, lines 36-38). Preference is given to using binders which are free from aromatic structural units (page 4, lines 38-39). This, in particular, does not include melamine (meth)acrylates, on account of the aromatic triazine ring that is always present in such compounds. Aliphatic urethane acrylates are particularly preferred. No further specific teaching is given on the chemical nature of the binders that are to be employed.

It was an object of the present invention, therefore, to provide coating compositions which are curable with actinic radiation, or thermally and with actinic radiation, and from which it is possible to obtain coating systems featuring high scratch resistance and at the same time featuring high weathering resistance. The coating obtained is, additionally, to conform to the exacting requirements imposed on an automobile coating system with respect in particular to gloss, gloss stability, chemical resistance, stone chip resistance, and strength of adhesion.

SUMMARY OF THE INVENTION

This object is surprisingly achieved through the provision of a coating composition curable with actinic radiation, or thermally and with actinic radiation, comprising (A) at least one unsaturated urethane (meth)acrylate and (B) at least one unsaturated melamine (meth)acrylate, the ratio of the weight fractions of components (A) and (B) being between (A):(B)= 1:1 and (A):(B)=1:5.

DETAILED DESCRIPTION OF AN EMBODIMENT OF THE INVENTION

Suitable unsaturated urethane (meth)acrylates (A) are in principle any desired unsaturated urethane acrylates and/or unsaturated urethane methacrylates. The term "unsaturated" in this context means that, on average, there is at least one reactive carbon-carbon double bond present in the molecule, in an acrylate group, for example. Aliphatic unsaturated urethane (meth)acrylates are used with preference. Suitable unsaturated urethane (meth)acrylates can be obtained, for example, by reacting a diisocyanate or polyisocyanate with a chain extender from the group of diols/polyols and/or diamines/polyamines and/or dithiols/polythiols and/or alkanolamines and then reacting the remaining free isocyanate groups with at least one hydroxyalkyl (meth)acrylate. The amounts of chain extender, diisocyanate and/or polyisocyanate, and hydroxyalkyl (meth)acrylate are in this case preferably chosen such that 1.) the ratio of equivalents of the NCO groups to the reactive groups of the chain extender (hydroxyl, amino and/or mercaptyl groups) is between 3:1 and 1:2, being preferably 2:1, and
2.) the OH groups of the hydroxyalkyl (meth)acrylates are present in stoichiometric amount in relation to the remaining free isocyanate groups of the prepolymer formed from isocyanate and chain extender.

Alternatively it is also possible, for example, to prepare suitable unsaturated urethane (meth)acrylates by first reacting some of the isocyanate groups of a diisocyanate or polyisocyanate with at least one hydroxyalkyl (meth)acrylate and subsequently reacting the remaining isocyanate groups with a chain extender of the type specified above. In this case as well, the amounts of chain extender, isocyanate and hydroxyalkyl (meth)acrylate are chosen so that the ratio of equivalents of the NCO groups to the reactive groups of the chain extender is between 3:1 and 1:2, being preferably 2:1 and the ratio of equivalents of the remaining NCO groups to the OH groups of the at least one hydroxyalkyl (meth)acrylate is 1:1.

As will be appreciated, all forms intermediate between these two processes are also possible. For example, some of the isocyanate groups of a diisocyanate can first be reacted with a diol, after which a further portion of the isocyanate groups can be reacted with a hydroxyalkyl (meth)acrylate, after which the remaining isocyanate groups can be reacted with a diamine.

These various processes for preparing the unsaturated urethane (meth)acrylates are known (e.g. EP-A-204 161) and therefore do not require any more exact description.

The unsaturated urethane (meth)acrylates can be flexibilized, for example, by reacting corresponding isocyanate-functional prepolymers and/or oligomers with relatively long-chain, aliphatic diols and/or diamines, more particularly aliphatic diols and/or diamines having at least 6 C atoms. This flexibilization reaction may be carried out before or after the addition of the at least one hydroxyalkyl (meth)acrylate.

Examples of suitable unsaturated urethane (meth)acrylates (A) also include the following commercially available products:

Desmolux® XP 2513, unsaturated aliphatic urethane acrylate from Bayer MaterialScience;

Ebecryl® 8465, unsaturated aliphatic urethane acrylate from Cytec,

Laromer® UA 9028V, unsaturated aliphatic urethane acrylate from BASF SE.

Preferably the at least one unsaturated urethane (meth)acrylate (A) has a weight-average molecular weight of 1000 to 10 000 g/mol, more preferably of 2000 to 5000 g/mol. The weight-average molecular weight is determined by means of gel permeation chromatography using polystyrene as a standard.

Generally speaking, acrylate groups react more readily than methacrylate groups, and so an easier reaction can take place. Preferably, therefore, the at least one unsaturated urethane (meth)acrylate is an unsaturated aliphatic urethane acrylate. More preferably it is an unsaturated aliphatic urethane acrylate based on hexamethylene diisocyanate (HDI), preferably in turn based on HDI trimers, and with very particular preference an unsaturated aliphatic urethane acrylate based on hexamethylene diisocyanate (HDI) and having an average functionality of 2 to 3 acrylate groups per molecule.

Suitable unsaturated melamine (meth)acrylates (B) are in principle any desired unsaturated melamine acrylates and/or unsaturated melamine methacrylates. The term "unsaturated" in this context means that on average there is at least one reactive carbon-carbon double bond present in the molecule, in an acrylate group for example. The at least one unsaturated melamine (meth)acrylate (B) preferably has a functionality of on average at least 3 (meth)acrylate radicals per triazine ring and more preferably of on average at least 4 (meth)acrylate radicals per triazine ring. Suitable unsaturated melamine (meth)acrylates can be prepared, for example, by direct etherification of hexamethylolmelamine (HMM) or by trans-esterification of hexakis(methoxymethyl)melamine (HMMM) with at least one hydroxy (meth)acrylate, such as for example hydroxyethyl (meth)acrylate, hydroxypropyl (meth)acrylate, 1,4-butanediol mono(meth)acrylate or caprolactone (meth)acrylate, for example.

Preferably the at least one unsaturated melamine (meth)acrylate (B) has a weight-average molecular weight of 1000 to 7000 g/mol, more preferably of 2000 to 4500 g/mol. The weight-average molecular weight is determined by means of gel permeation chromatography, using polystyrene as standard.

Generally speaking, acrylate groups are more ready to react than methacrylate groups, and so an easier reaction can take place. Preferably therefore, the at least one unsaturated melamine (meth)acrylate (B) is an unsaturated melamine acrylate, more preferably an unsaturated melamine acrylate having a functionality of on average at least 3 (meth)acrylate radicals per triazine ring, and with very particular preference it is an unsaturated melamine acrylate having a functionality of on average at least 4 (meth)acrylate radicals per triazine ring.

Examples of suitable unsaturated melamine (meth)acrylates (B) include the following commercially available products:

CN890, polyfunctional melamine acrylate from Sartomer;

BMM-215; trifunctional melamine methacrylate from Bomar Specialties Co.;

BMA-200; trifunctional melamine acrylate from Bomar Specialties Co.;

BMA-222; trifunctional melamine acrylate from Bomar Specialties Co.;

BMA-300; trifunctional melamine acrylate from Bomar Specialties Co.

The ratio of the weight fractions of the components (A) and (B) is in accordance with the invention between (A):(B)=1:1 and (A):(B)=1:5. Preferably the ratio of the weight fractions is between (A):(B)=1:1.5 and (A):(B)=1:2.5, more preferably between (A):(B)=1:1.8 and (A):(B)=1:2.2.

In the coating material of the invention the components (A) and (B) are used preferably in an amount [(A)+(B)] of 30 to 90% by weight, more preferably of 50 to 70% by weight, based on the total weight of the liquid coating composition.

Where the coating compositions of the invention are to be cured by means of UV radiation, the coating compositions of the invention comprise at least one photoinitiator (C). It is preferred to use 0.1% to 5% by weight, more preferably 0.5 to 3% by weight, based on the sum of the components (A), (B), (C) and any reactive diluents present, of at least one photoinitiator (C). Use may be made of the typical photoinitiators known to the skilled worker that are used in UV-curable coating compositions, examples being the products available commercially under the names Irgacure® 184, Irgacure® 2959, Irgacure® 819, Darocure® MBF (all from CIBA Specialty Chemicals Inc.) and Lucirin® TPO (from BASF AG). The absorption of the photoinitiators employed is situated preferably in the wavelength range of 200-400 nm.

The coating compositions of the invention may where appropriate also comprise one or more reactive diluents. These reactive diluents may be ethylenically unsaturated compounds. The reactive diluents may, for example, be mono-, di- or polyunsaturated. A reactive diluent is a solvent which in the course of film formation becomes part of the binder through chemical reaction.

The coating compositions of the invention may, where appropriate, also comprise one or more solvents which are not included among the reactive diluents, examples being ethers, esters, aliphatic and/or aromatic hydrocarbons, more particularly xylene, butyl acetate, methyl ethyl ketone and/or ethanol.

The coating compositions of the invention may comprise further customary additives, examples being light stabilizers (e.g. HALS compounds, benzotriazoles, benzophenones, triazines, oxalanilides and the like), slip additives, polymerization inhibitors, matting agents, defoamers, flow control agents or other additives used typically in coating materials. The typical additives are employed customarily in an amount of up to 15% by weight, preferably 2 to 9% by weight, based on the total weight of the coating composition. The coating composition of the invention preferably comprises at least one light stabilizer.

The coating compositions of the invention are preferably clear coat materials, and so preferably contain no fillers, or only transparent fillers, and no opaque pigments. However, use in the form of pigmented coating compositions is also possible. In that case the coating compositions contain 2 to 40% by weight, based on the total weight of the coating composition, of one or more pigments. In that case, in addition the coating compositions may also contain 1% to 20% by weight, based on the total weight of the coating composition, of one or more fillers. Where relatively high concentrations of pigment and/or of filler are employed, a preferred method of curing is electron beam curing.

The present invention further provides for the use of a coating composition of the invention to produce a coating system. To produce a coating system, the coating compositions of the invention may be applied to the substrate to be coated by means of the customary application techniques known to the skilled worker. Application may take place, for example, by means of spreading, rolling, spraying, dipping, knife-coating, roller coating, pouring or injecting.

Application of the coating composition of the invention takes place preferably in a dry film thickness of 5-60 μm, more preferably of 20-50 μm and very preferably of 35-45 μm.

The coating composition of the invention can be used to produce single-coat or multicoat coating systems. In the case of production of multicoat coating systems, the coating composition of the invention may be used to produce a base coat, to which one or more further top coat films are applied, or else may be used to produce the topmost top coat film of the multicoat coating system. The coating composition of the invention is used preferably to produce the topmost coat of a multicoat coating system.

The coating composition can be used to produce a coating on any desired substrates to be coated: for example, to coat metallic substrates. The coating compositions of the invention are used preferably to coat automobile bodies and parts thereof.

With very particular preference, the coating compositions of the invention are used to produce a top coat finish on automobile bodies and parts thereof, and with particular preference to produce clear top coat finishes in automotive OEM finishing.

To produce coatings on metal substrates, the coating compositions of the invention are applied preferably to automobile bodies or parts thereof, metal coils, and/or metal sheets that have been primed and/or coated with a base coat material. Primers which can be used are the primers typically employed. As base coat material it is possible for both conventional base coat materials and also aqueous base coat materials to be employed, curing thermally and/or by radiation. It is also possible, furthermore, to apply the coating compositions of the invention to metal substrates which have been coated first with an electrodeposition coating and subsequently with a surfacer and/or a base coat material. This may also have been done using the wet-on-wet technique. With the stated techniques it is generally necessary for the base coat and/or surfacer to be baked before the coating composition of the invention is applied.

The coating composition applied to the substrate is cured with actinic radiation or both thermally and with actinic radiation.

Curing may be preceded by intermediate drying of the applied coating composition, with the purpose, for example, of flashing off the solvents present, at 30° C. to 80° C. for 5 to 30 minutes, for example.

In the context of the present invention the term "thermal curing" denotes the heat-initiated curing of a film of a coating composition.

In the context of the present invention, actinic radiation means electromagnetic radiation such as near infrared (NIR), visible light, UV radiation, X-rays or gamma radiation, more particularly UV radiation, and particulate radiation such as electron beams, beta radiation, alpha radiation, proton beams or neutron beams, more particularly electron beams. Curing by UV radiation is typically initiated by means of free-radical or cationic photoinitiators. Curing by actinic radiation is preferably curing by UV radiation or curing by electron beams.

Where thermal curing and the curing with actinic radiation are employed jointly in the context of one coating composition of the invention, the term "dual cure" is also used.

Thermal curing and curing with actinic radiation may take place by means of systems known in each case for this purpose to the skilled worker, under the typical known conditions. By way of example, UV curing may take place with a UV dose of 100-10 000 mJ/cm$^2$, a radiation strength of 50 - 4000 mW/cm$^2$ (measuring instrument: Power Puck, EIT Inc.) and a residual oxygen content of <0.2%. Electron beam curing may take place, for example, with a dose of 5-15 kGray.

The present invention further provides a substrate coated with the coating composition of the invention, preferably an automobile body or a part thereof.

The invention is illustrated below by examples.

EXAMPLES

Inventive Example 1

Preparation of an Inventive Coating Composition

Items 1 to 5 as indicated in column B of Table 1 are introduced and are processed with stirring to a homogeneous mixture. Subsequently items 6 to 10 are added in succession with stirring. Further stirring produces a homogeneous mixture.

Comparative Example 1

Preparation of a Non-Inventive Coating Composition

Items 1 to 5 as indicated in column A of Table 1 are introduced and are processed with stirring to a homogeneous mixture. Subsequently items 6 to 10 are added in succession with stirring. Further stirring produces a homogeneous mixture.

TABLE 1

| | | | A: Comparative | B: Inventive |
|---|---|---|---|---|
| 1 | Desmolux ® XP 2513 (UV-reactive oligomer) | aliphatic urethane acrylate, Bayer MaterialScience | 29.4 | 22.4 |
| 2 | DPHA (UV-reactive oligomer) | dipentaerythritol penta/hexaacrylate | 29.4 | — |
| 3 | CN890 (UV-reactive oligomer) | melamine acrylate, Sartomer Inc. | — | 47.8 |
| 4 | Xylene (solvent) | | 25.4 | 17.9 |
| 5 | Butyl acetate (solvent) | | 12.7 | 8.3 |
| 6 | Tinuvin ® 292 (light stabilizer (HALS)) | CIBA Specialty Chemicals Inc. | 0.57 | 0.7 |
| 7 | Tinuvin ® 400 (light stabilizer) | CIBA Specialty Chemicals Inc. | 0.7 | 0.8 |
| 8 | Irgacure ® 184 (photoinitiator, absorption maxima 246-333 nm) | 1-hydroxycyclohexyl phenyl ketone, CIBA Specialty Chemicals Inc. | 0.88 | 1 |
| 9 | Lucirin ® TPO (photoinitiator, absorption maxima 295-393 nm) | diphenyl(2,4,6-trimethylbenzoyl) phosphine oxide, BASF AG | 0.88 | 1 |

TABLE 1-continued

| | | A: Comparative | B: Inventive |
|---|---|---|---|
| 10 | Byk 331 (flow control agent) | polyether-modified polydimethylsiloxane, BYK Chemie GmbH | 0.07 | 0.1 |

Production of Coating Systems

The inventive coating composition from inventive example 1 and the non-inventive coating composition from comparative example 1 were used to produce clear top coat finishes in accordance with the following specification.

The substrates used were steel panels which had been given a preliminary coating of a typical cathode electrocoat (CathoGuard 500, BASF). Atop this coat a typical aqueous base coat material was applied with a dry film thickness of 13-18 µm and was baked at 80° C. for 10 minutes and then at 130° C. for 15 minutes. Applied thereto on the same day was the inventive coating composition from inventive example 1 or the non-inventive coating composition from comparative example 1, by means of spray application in a dry film thickness of 40-45 µm. After the solvents had been flashed off at 60° C. for 15 minutes, UV curing took place with a UV dose of 4000 mJ/cm$^2$, an irradiation strength of 2000 mW/cm$^2$ (measuring instrument: Power Puck, EIT Inc.), a residual oxygen content of <0.1% and an exposure temperature of 45° C.

Tests and Properties of the Coating Systems

The coating systems obtained had the properties indicated in Tables 2 to 9.

The chemical resistance (Table 2) was determined by means of a gradient oven test (corresponding to DIN EN ISO 2812-5). The coating systems are each sprinkled with the stated chemicals and incubated for 30 min at different temperatures X before being stored under standard conditions at 23° C. for 24 hours and optionally thereafter heated in the oven at 80° C. for 2 hours. The figure recorded is the highest incubation temperature X in degrees Celsius, at which, after storage (24 h at 23° C.) and/or after subsequent heating (2 h at 80° C.) there is still no optically visible damage apparent to the coating system.

For the determination of the scratch resistance (Table 3), a determination was first made of the initial gloss of the coating system from an observation angle of 20°. Thereafter the coating system was subjected to scratch exposure in accordance with DIN EN ISO 20566 DE (AMTEC wash brush resistance). Following the exposure, the sample was cleaned with white spirit and the gloss measured again. The resultant residual gloss, in %, is the product of the ratio of the gloss values before and after exposure.

In addition, the scratch resistance was tested in accordance with the test specification of ASTM D 6279. The results are shown in Table 4.

The stone chip resistance (Table 5) of the coating systems was tested by means of the VDA [German Automakers Association] multiple stone chip apparatus in accordance with DIN EN ISO 20567-1.

The adhesion of the coating systems was determined by means of a ball impact test in accordance with DIN 55996-3 (Table 6) and also be means of a constant condensation conditions test (CC test) over 240 hours in accordance with DIN 50017 CC (Table 7).

To test the weathering resistance of the coating systems, the QUV weathering apparatus from Q-Panel was used. Crack formation was assessed visually at different points in time (Table 8) (OK=satisfactory). The gloss was determined at different points in time from an observation angle of 20° (Table 9).

TABLE 2

| Chemical resistance | Coating system from comparative example 1 | Coating system from inventive example 1 |
|---|---|---|
| NaOH, beginning of damage, 24 h (23° C.) after testing (° C.) | 39 | 48 |
| NaOH, beginning of damage, 24 h (23° C.) and 2 h (80° C.) after testing (° C.) | 40 | 50 |
| Pancreatin, beginning of damage, 24 h (23° C.) after testing (° C.) | <36 | 46 |
| Pancreatin, beginning of damage, 24 h (23° C.) and 2 h (80° C.) after testing (° C.) | 66 | >75 |
| Tree resin, beginning of damage, 24 h (23° C.) after testing (° C.) | 40 | 60 |
| Tree resin, beginning of damage, 24 h (23° C.) and 2 h (80° C.) after testing (° C.) | 64 | >75 |
| Distilled water, beginning of damage, 24 h (23° C.) after testing (° C.) | >75 | >75 |
| Distilled water, beginning of damage, 24 h (23° C.) and 2 h (80° C.) after testing (° C.) | >75 | >75 |

TABLE 3

| Scratch resistance (AMTEC) | Coating system from comparative example 1 | Coating system from inventive example 1 |
|---|---|---|
| Initial gloss (20°) | 89 | 90 |
| Gloss after cleaning (20°) | 80 | 82 |
| Difference in gloss | 9 | 8 |
| Percentage residual gloss | 90% | 91.1% |

TABLE 4

| Scratch resistance (Crockmeter) | Coating system from comparative example 1 | Coating system from inventive example 1 |
|---|---|---|
| Gloss (20°), unexposed | 89 | 91 |
| Gloss (20°), exposed | 87 | 89 |
| Percentage residual gloss | 97.8 | 97.8 |

TABLE 5

| Stone chip resistance | Coating system from comparative example 1 | Coating system from inventive example 1 |
|---|---|---|
| VDA multiple stone chip testing, score | 2 | 2 |
| Degree of rusting | 1.5 | 1.5 |

TABLE 6

| Adhesion (ball impact test) | Coating system from comparative example 1 | Coating system from inventive example 1 |
|---|---|---|
| Delamination (mm$^2$) | 8 | 4 |
| Degree of rusting | 1 | 1 |

TABLE 7

| Adhesion (CC test) | Coating system from comparative example 1 | Coating system from inventive example 1 |
| --- | --- | --- |
| Cross-cut before exposure | 1 | 1 |
| Cross-cut after exposure 1 h | 1 | 1 |
| Cross-cut after exposure 24 h | 1 | 1 |
| Degree of blistering, 1 h after exposure, amount | 1 | 1 |
| Degree of blistering, 1 h after exposure, blister size | 1 | 1 |
| Degree of blistering, 1 h after exposure, remark | slight swelling | slight swelling |
| Scratch sample 1 h after exposure | 5 | 5 |
| Scratch sample 24 h after exposure | 3 | 3 |

TABLE 8

| Weathering resistance (QUV test) crack formation after . . . | Coating system from comparative example 1 | Coating system from inventive example 1 |
| --- | --- | --- |
| 250 h | OK | OK |
| 500 h | cracked | OK |
| 750 h | | OK |
| 1000 h | | OK |
| 1250 h | | OK |
| 1500 h | | OK |
| 1750 h | | OK |
| 2000 h | | OK |
| 2250 h | | OK |
| 2500 h | | OK |
| 2750 h | | cracked |

TABLE 9

| Weathering resistance (QUV test) gloss after . . . | Coating system from comparative example 1 | Coating system from inventive example 1 |
| --- | --- | --- |
| 250 h | 89 | 89 |
| 500 h | 89 | 88 |
| 750 h | 87 | 86 |
| 1000 h | | 86 |
| 1250 h | | 88 |
| 1500 h | | 88 |
| 1750 h | | 87 |
| 2000 h | | 85 |

The results of the test show clearly that the coating systems obtained from the coating composition of the invention exhibit very high scratch resistance (Tables 3 and 4) in conjunction with a weathering resistance (Tables 8 and 9) that is improved over that of conventional coating systems. In addition, the coating systems obtained from the coating composition of the invention exhibit a chemical resistance improved over that of conventional coating systems (Table 2), but still with a high stone chip resistance (Table 5) and adhesion (Tables 6 and 7).

What is claimed is:

1. A coating composition curable with actinic radiation, or thermally and with actinic radiation, comprising
    (A) at least one unsaturated urethane (meth)acrylate, and
    (B) at least one unsaturated melamine (meth)acrylate,
    wherein the ratio of the weight fractions of components (A) and (B) is between (A):(B)=1:1 and (A):(B)=1:5.

2. The coating composition of claim 1, wherein the ratio of the weight fractions is between (A):(B)=1:1.5 and (A):(B)=1:2.5.

3. The coating composition of claim 1, wherein, the at least one unsaturated urethane (meth)acrylate (A) comprises an aliphatic unsaturated urethane (meth)acrylate.

4. The coating composition of claim 1, wherein the at least one unsaturated urethane (meth)acrylate (A) comprises an unsaturated urethane acrylate.

5. The coating composition of claim 1, wherein the at least one unsaturated melamine (meth)acrylate (B) comprises a functionality of on average at least 3 (meth)acrylate radicals per triazine ring.

6. The coating composition of claim 1, wherein the at least one unsaturated melamine (meth)acrylate (B) comprises an unsaturated melamine acrylate.

7. The coating composition of claim 1, wherein the coating composition is curable by means of UV radiation, or thermally and with UV radiation, and further comprises at least one photoinitiator (C).

8. The coating composition of claim 7, wherein the coating composition is curable by means of electron beams or thermally and with electron beams.

9. The coating composition of claim 1, which is a clear coat material.

10. A method of making a coating system, comprising applying the coating of claim 1 to a substrate.

11. The method of of claim 10, wherein the system in question is the topmost coat of a multi coat coating system.

12. The method of claim 10, wherein the substrate is an automobile body or a part thereof.

13. A substrate coated with the coating composition of claim 1.

14. The substrate of claim 13, which is an automobile body or a part thereof.

15. A coating composition curable with actinic radiation, or thermally and with actinic radiation, comprising:
    (A) at least one aliphatic unsaturated urethane (meth)acrylate, and
    (B) at least one unsaturated melamine (meth)acrylate comprising a functionality of on average at least 3 (meth)acrylate radicals per triazine ring
    wherein the ratio of the weight fractions of components (A) and (B) is between (A):(B)=1:1 and (A):(B)=1:5.

16. The coating composition of claim 15, wherein the ratio of the weight fractions of components (A) and (B) is between (A):(B)=1:1.5 and (A):(B)=1:2.5.

* * * * *